Nov. 10, 1970 — R. R. REDDY — 3,538,721
UNIVERSAL JOINT
Filed March 28, 1969 — 2 Sheets-Sheet 2
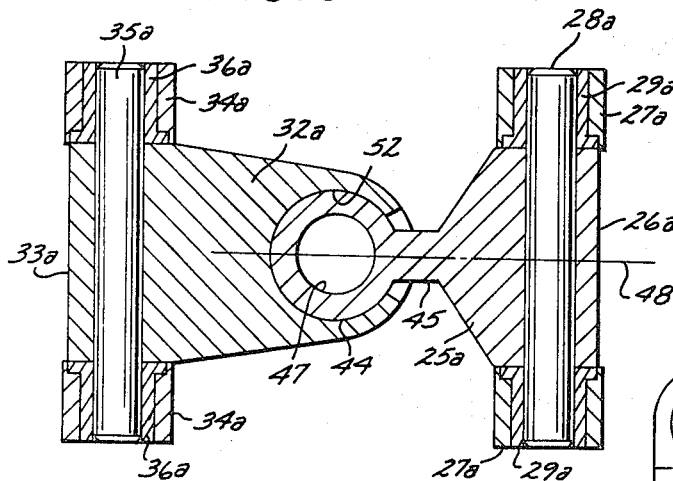
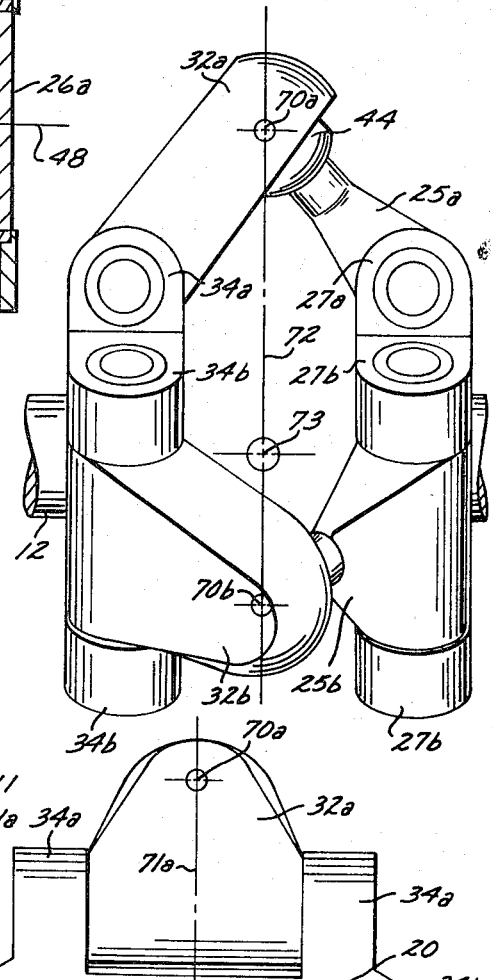
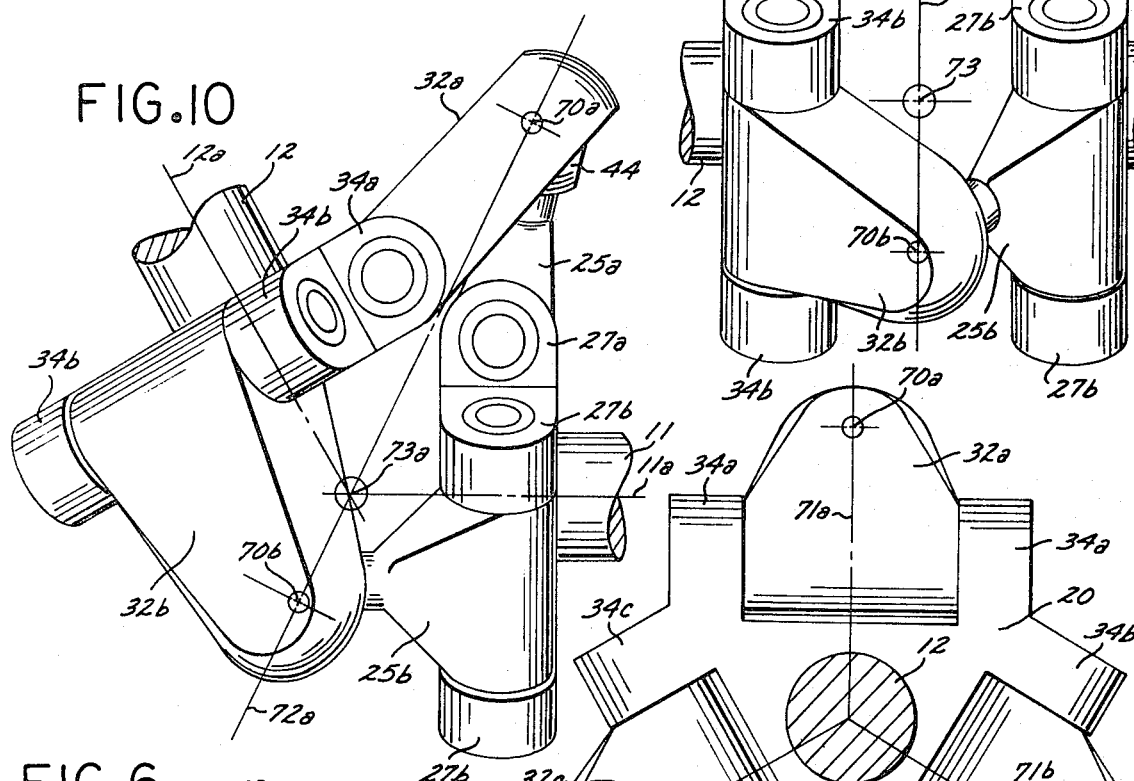
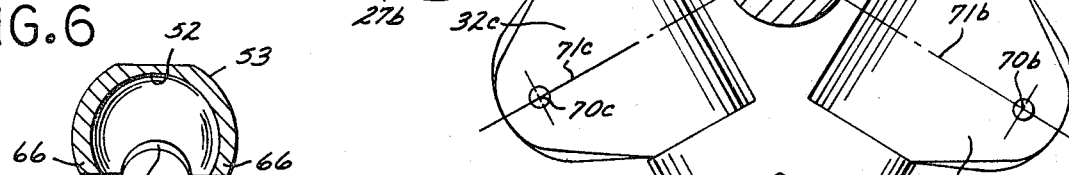
INVENTOR.
ROBERT R. REDDY
BY Noel G. Conway
ATTORNEY

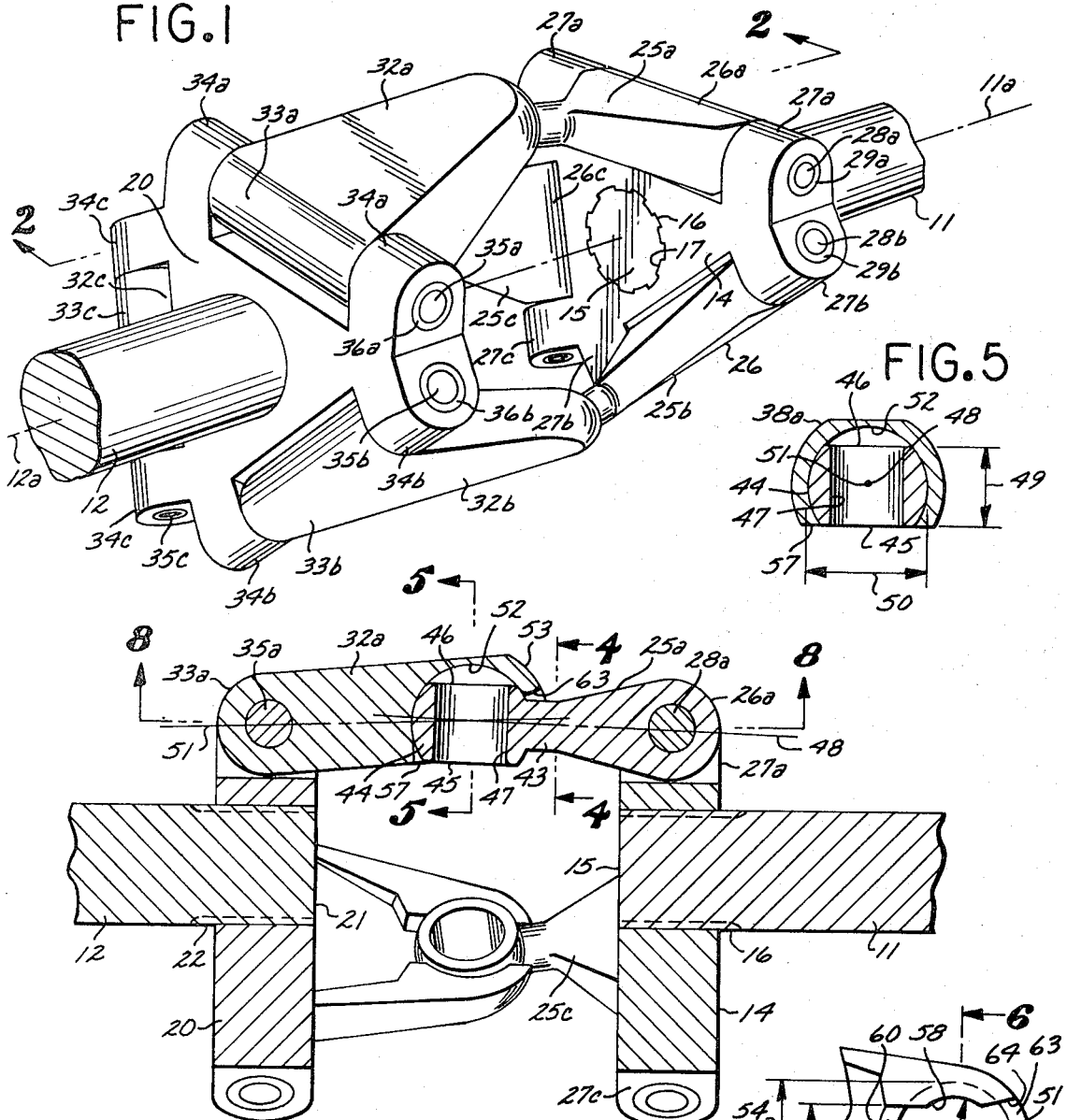

United States Patent Office 3,538,721
Patented Nov. 10, 1970

3,538,721
UNIVERSAL JOINT
Robert R. Reddy, Pasadena, Calif., assignor of one-third to Joseph W. Wiechowski, San Clemente, Calif., and Salvatore Pirozzi, Garden Grove, Calif.
Filed Mar. 28, 1969, Ser. No. 811,447
Int. Cl. F16d 3/30
U.S. Cl. 64—21    6 Claims

ABSTRACT OF THE DISCLOSURE

A universal joint including a first and second cross member on juxtapositioned ends of first and second rotatable shafts and including a plurality of pairs of first and second arms disposed in a circle around the rotation axes of said shafts, said first and second arms being swingably connected to said first and second cross members respectively about axes perpendicular to the rotation axes of said shafts; each pair of arms having a pivotal connection together including a partial sphere on a first arm of each pair, which partial sphere has a flat surface facing the rotation axes of said shafts and a flat surface on the opposite side of said sphere from said last mentioned surface. Said second arm of each pair having a spherical cavity in which said partial sphere is received, which cavity opens through a second arm face facing the rotation axes of said shafts, which opening has a length extending at a right angle to the axis about which the arm swings equal to the diameter of the cavity and a width extending at a right angle to said last mentioned length, which last mentioned width is less than said length and at least equal to the thickness of the partial sphere.

---

This invention relates to universal joints, and more particularly to constant velocity universal joints which may be rapidly disassembled.

A primary area of use of embodiments of the present invention is in the transmission of power between two rotatable shafts which are not continuously in the same spaced relation. In such universal joints, it is extremely desirable that there be a constant velocity in the transmission of the power. More particularly, if the driving shaft is rotating at a constant speed, it is desired that the driven shaft also rotate at that same constant speed. In some prior universal joints, the velocity of the driven shaft will vary as the shaft is being rotated, which variation in velocity is caused by the inadequacies of the mechanical design of the universal joint.

Constant velocity universal joints have been provided in the past, however, they have been complicated in structure, and therefore, have been expensive to manufacture and require increased maintenance.

In addition, there is the desired feature of a universal joint that it be able to accommodate longitudinal movements of the two shafts relative to each other without causing the mechanical interconnecting linkage to bind when the shafts are turning at a rather large angle to each other. Although some prior universal joints are able to do this, they have had the difficulty that they are unable to transmit large amounts of torque and/or power without requiring excessive size in the universal joint. Those constant velocity universal joints which are able to accommodate such large angular differences in the relation of the shaft axes have had the problem that they cannot accommodate such longitudinal movement of the shafts.

Another aspect of the present invention is that the mechanical interlinkage of the two sides of the joint is accomplished by a plurality of pairs of arms, and there is provided on one of each pair of arms an enlargement preferably taking the form of a partial spherical ball which is received in a spherical cavity on the other arm of each pair. And, the partial spherical ball and the cavity are shaped such that the ball may be removed from the cavity by rotating the arm having the ball relative to the arm having the cavity in a particular manner. During the normal operation of the joint, the joint inherently prevents such relative rotation. However, by disconnecting one of the two arms of the pair from its respective cross member and/or rotary shaft, the desired rotation may be effected in order to disassemble the arms.

With the foregoing in mind, it is a major object of this invention to provide an improved universal joint.

Another object of this invention is to provide an improved universal joint which is able to transmit a constant velocity from the driving shaft to the driven shaft.

A further object of this invention is to provide a universal joint of compact size for transmitting relatively large torques and/or power.

It is a still further object of this invention to provide a universal joint which may be rapidly assembled or disassembled.

It is still another object of this invention to provide an improved universal joint which may be manufactured at a low cost and economically maintained.

It is a still further object of this invention to provide a simple universal joint which will transmit a constant velocity through a wide range of angular relations between the driving and driven shafts to which the joint is connected.

A still further object of this invention is to provide a simple universal joint which is capable of accommodating longitudinal movement of the driving shaft and the driven shaft relative to each other.

Other and further objects of this invention will become apparent in the detailed description below in connection with the attached drawings wherein:

FIG. 1 is a perspective view of a preferred embodiment of the present invention;

FIG. 2 is a cross sectional elevational view of the universal joint taken along line 2—2 in FIG. 1;

FIG. 3 is an enlarged fragmentary view of the cavity included in one arm of each of the pairs of arms used by the universal joint;

FIG. 4 is a partial cross sectional view taken along line 4—4 in FIG. 2 and disclosing the end of the member having the cavity;

FIG. 5 is a cross sectional view of the cavity and the partial spherical ball taken along line 5—5 in FIG. 2;

FIG. 6 is a cross sectional view of the cavity taken along the same line as FIG. 5, but with the partial spherical ball removed;

FIG. 7 is a fragmentary cross sectional view of the cavity as seen in the aspect of FIG. 2 but with the partial spherical ball removed;

FIG. 8 is a cross sectional view of a pair of arms interconnecting the two shafts as taken along line 8—8 in FIG. 2;

FIG. 9 is an elevation view of the universal joint with the rotatable shafts in alignment;

FIG. 10 is an elevation view of the universal joint with the driving and driven shafts at a substantial angle to each other; and FIG. 11 is an end view of the universal joint.

Referring now to the drawings, there is shown a pair of shafts 11 and 12 which are mounted for rotation about axes 11a and 12a respectively. The shafts 11 and 12 are supported by conventional bearing structure (not shown) such that the axes of rotation 11a and 12a may be pivoted relative to each other, however, the axes of rotation always intersect each other at a point midway between the shafts.

The shaft 11 has a cross member 14 secured at end 15 of the shaft. The cross member 14 is held for rotation with the shaft by means of splines 16 on the shaft which intercooperate with corresponding splines 17 on the cross member. The shaft 12 has a corresponding cross member 20 at end 21 of the shaft. Cross member 20 is provided with unnumbered splines which intercooperate with splines 22 on the shaft 12.

The transmission of the rotational forces from the shaft 11 to the shaft 12 (or vice versa) is accomplished through the use of a plurality of pairs of arms, which pairs are disposed in a circle around the axes of rotation of said shafts. Referring to FIGS. 1, 2, and 8 in particular, it can be seen that the cross member 14 has three first arms 25a–c thereon, each of which arms is swingably mounted at its respective first end 26a–c to the cross member. Such mounting is accomplished by providing a pair of bearing ears on one of a first arm, e.g., 26a, or the cross member 14. Preferably, bearing ears 27a on the cross member 14 serve to mount the first arm 25a to the cross member 14 through the use of a pin 28a extending through said bearing ears. Bushings 29a are provided to reduce friction in the swinging movement of the arm 25a. The first arms 25b and c are also mounted in the same manner as the first arm 25a. More particularly, bearing ears 27b function with pin 28b and bushings 29b for the same purpose. And, first end 26c of the first arm 25c is mounted the same way through the use of bearing ears 27c.

With the structure just described, it can be seen that each of the first arm 25a–c are mounted for swinging movement around an axis which extends at a right angle to the axis of rotation 11a of the first shaft 11. And, it can be seen that the three first arms 25a–c are disposed in a circle around the said axis of rotation.

In opposed relationship to the first arms 25a–c, there are provided corresponding seconds arms 32a–c. Each of these second arms 32a–c have a first end 33a–c which is swingably secured to the cross member 20 for motion about an axis at a right angle to said rotation axis 12a. The second arms 32a–c are disposed in circle around the axis 12a of rotation of the shaft. In order to cause each of the arms 32a–c to swing properly, there are provided pins 35a–c which extend through the first ends 33a–c respectively, and are received in the bearing ears 34a–c respectively. As in the case of the bushings 29a–c, bushings 36a–c are provided.

Further details of the first arms 25a–c will be described only in connection with the first arm 25a. This is because the other two first arms 25b and c are exactly the same.

Referring now to FIGS. 2, 5, and 8, it can be seen, that the arm 25a is very wide at its first end 26a. This assists in enabling large torques to be transferred. Said first arm 25a rapidly narrows down into a rather small diameter neck 43, and has at its second end an enlargement, preferably taking the form of a partial spherical ball 44. This partial spherical ball 44 has an inner flat surface 45 on the side of the ball facing the center of the circle in which the pairs of arms are disposed, i.e., facing the rotation axes 11a and 12a. On the opposite side of the partial spherical ball 44 from the inner surface 45, there is an outer surface 46 which extends parallel to said inner surface. Additionally, there has been provided a hole 47 extending through the ball 44 for purposes of reducing weight and assisting in supplying lubricant into the working area.

As will be described further below, these flat surfaces 45 and 46 are provided in order to remove the partial spherical ball 44 from the arm 32a by rotating the arm 25a relative to an axis extending through the first end 26a and the second end of the arm. In FIGS. 2, 5, and 8, line 48 illustrates such axis. (In FIG. 5, the line 48 is shown as only a dot since the axis extends into the paper). The manner in which the first arm 25a may be disconnected from the second arm 32a will now be described in further detail. However, at this point, it should be noted that the distance between the two surfaces 45 and 46, which distances indicated by dimension line 49 is substantially less than the width of the partial spherical ball 44, which width is indicated by dimension line 50 (see FIG. 5 in particular). This is for a purpose to be described.

As in the case of the first arm 25a–c, the second arm 32a–c will only be described in further detail only in relation to the second arm 32a. The other two second arms 32b and c are the same. As can be seen, the second arm 32a is elongated and has an axis 51 (see FIGS. 2, 3, and 5) extending generally from the first end 33a to the second end 53. Located at the second end 53, there is a spherical cavity 52. This spherical cavity 52 has a diameter equal to the width of the partial spherical ball 44. Accordingly, it can be seen that dimension line 54 (see FIG. 3) indicating the diameter of the spherical cavity is substantially the same as the length of the dimension line 50 (see FIG. 5) indicating the width of the spherical ball 44.

It will be noted that the spherical cavity 52 opens through inner side 57 of the arm 32a. The dimensions of the opening are of particular significance. Firstly, it can be seen that the spherical cavity surface has generated at the intersection of the spherical surface and the flat face 57 a partial circular section 58 of the opening. This circular section 58 has a cross dimension (indicated by dimension line 59) which is somewhat smaller than the main diameter of the spherical cavity. Additionally, it can be seen that the left side of the cavity area (as seen in FIGS. 3 and 7) has been cut away at 60, and additionally, that the opening has a width (indicated by dimension line 61) which is slightly greater than the thickness (indicated by dimension line 49) of the spherical ball 44.

At the side of the cavity 52 toward the first member 25a, the second end 53 is further cut away at 63 to a point which is several degrees outward (as compared to inner surface 57) of the center of the cavity. This will permit ample clearance for the neck 43 on the first member 25a when the shafts 11 and 12 are being rotated at rather substantial angles to each other. The cut away portion area at 63 has a curved section at its top (see FIG. 4) and has two sides 64 which extend away from each other as they extend away from the spherical cavity 52. This is done in order to provide ample clearance for the neck 43.

With the cavity 52 being formed as described, it can be seen that the cut away portions 60 and 63 cause the opening to have a length (measured parallel to the axis 51) which is effectively equal to the diameter of the opening (i.e., the dimension measured parallel to the pin 35a, i.e., the axis of rotation of the second arm 32a) is substantially smaller. These cut away portions 60 and 63 have the result of leaving a pair of fingers 66 on either side of the opening through the surface, or face, 57. These fingers 66 extend more than half way around the spherical ball 44. Accordingly, regardless of the longitudinal motion of the shafts 11 and 12, the partial spherical ball 44 will be held in its relation in the cavity 52 as long as the swinging axis of the first and second members 25a and 32a respectively, are maintained rather parallel.

When it is desired to disconnect the first arm 25a from the second arm 32a, the pin 28a is removed. Then, the first arm 25a can be rotated to a substantial angle relative to the axis 48. With the preferred structure shown, the first arm 25a will have to be turned nearly 90° from the position shown in FIG. 2 in order to remove the spherical ball 44. If the fingers did not come so far around the spherical ball, i.e., if the width of the opening (as indicated by dimension line 61) were wider, the spherical ball would not have to be turned so far in order to remove the same. It is best if the opening is sized such that the ball must be turned at least 70° in order that the fingers 66 will have an adequate purchase on the spherical ball.

The intercooperation of the partial spherical balls and cavities on the arms 25b and 32b respectively, and 25c and 32c respectively, will not be described as they are the same as the first and second arms 25a and 32a.

With the arrangement described, the resulting universal joint can operate in a wide variety of angular relationships and transmit rotation to the driven shafts at a constant velocity.

Referring now to FIGS. 9 to 11, the operation of the device will be described in further detail. In FIG. 11 there have been designated points 70a–c which are in line (as seen in this figure) with the center of the spherical cavities in the respective second arms 32a–c. Additionally, there have been provided center lines 71a–c which meet at the center of the shaft 12. These center lines 71a–c signify the edges of the planes in which the second arms swing about their respective bearing points and pins 35a–c. By the nature of the construction, the points 70a–c are always equidistant from the axis of rotation of the shaft 12. As can be seen in FIG. 9, when the shafts 11 and 12 are pulled further apart, the arms 25a–c and 32a–c will swing into a position more parallel to each other (such as shown in FIG. 1). And, then as the shafts 11 and 12 are moved closer together the arms 25a–c and 32a–c move to a position more perpendicular to said axis of rotation of said shaft. Thereby, it can be seen that the subject universal joint can accommodate such longitudinal motion of the two shafts 11 and 12.

In FIG. 9, there is shown point 73 which is on the common axis of rotation of the shafts 11 and 12 (since said shafts are in the parallel position), and also on a plane, the edge of which is indicated by center line 72. As can be seen, points 70a and 70b are in that plane 72. And, the point 70c is also in that plane.

In FIG. 10, there is shown the relationship of the components of the universal joint when the device is operated at a substantial angle. More particularly, there is shown a point 73a at the intersection of the axis of rotation 11a and 12a. It will be noted that a plane extending through the centers of the various cavities (two of which are indicated by points 70a and 70b in FIG. 10) passes through the point 73a; the edge of said plane being designated by center line 72a.

While only one embodiment of the present invention has been shown and described in detail, it will be apparent to those skilled in the art that such is by way of illustration only and that numerous changes may be made without departing from the spirit of the present invention.

I claim:

1. A universal joint for use with first and second rotatable shafts each having an end in juxtaposition to a corresponding end of the other, said shafts being mounted for rotation about first and second axes which intersect each other, said universal joint comprising:
a first cross member secured to the end of said first shaft;
a second cross member secured to the end of said second shaft;
swinging arm means connecting the rotary motion of of said first shaft to said second shaft, said swinging arm means comprising:
a plurality of pairs of first and second arms;
swing mount means swingably securing one end of each first arm of each pair to said first cross member for swinging movement about an axis which is at a right angle to the axis of rotation of said first shaft, and for swingably securing one end of each second arm of each pair to said second cross member for swinging movement about an axis which is at a right angle to the axis of rotation of said second shaft;
pivot means pivotably connecting together said first and second arms of each pair at a second end of each of said arms, said pivot means permitting two arms of a pair to be disconnected by rotating one arm of each pair at least a substantial angle relative to the other about an axis extending through said first and second ends of said one arm.

2. The universal joint set forth in claim 1 wherein said pivot means comprises for each pair of arms:
an enlargement on a second end of a first arm of said pair, said enlargement having a predetermined thickness as measured at a right angle to said last mentioned axis, said enlargement having a width as measured at a right angle to said last mentioned axis which width is larger than said thickness;
a cavity in the second end of the second arm of the pair, said cavity having a cross dimension measured at a right angle to an axis extending through said first and second ends of said last mentioned arm, said cross dimension being of sufficient size to receive said enlargement therein, said second arm having therein an opening on one side of the above mentioned axis in said second arm, said opening communicating said cavity with said one side of said second arm, said opening being larger than said thickness of said enlargement and smaller than said width of said enlargement and said cross dimension, whereby said enlargement can be removed from said cavity when said enlargement is oriented with said thickness extending across said opening but cannot be removed when said enlargement is oriented with said width extending across said opening.

3. The universal joint set forth in claim 2 wherein:
said enlargement on said first arm of the pair has two opposed flat surfaces between which said thickness is measured; and
said opening has a minimum width as measured parallel to said axis about which said second arm swings only slightly larger than said thickness of said enlargement.

4. The universal joint set forth in claim 3 wherein:
said enlargement has a spherical surface in the area between said flat surfaces; and
said cavity has a spherical surface extending more than half way around said enlargement, said cavity surface being cut away on either side of said cavity through which passes said axis extending through the first and second ends of said second member, said spherical surface being no more than one half way around the cavity at said cut away portions.

5. The universal joint set forth in claims 1, 2, or 3 wherein said one arm of each pair must be rotated at least 70° relative to the other arm of the pair about said axis extending through said first and second ends of said one arm.

6. The universal joint set forth in claim 1 wherein said pairs of arms are disposed in a circle around the inner section of the axis about which said shafts are rotatable and said pivot means includes:
a partial spherical ball on said first arm of each pair, said ball having two flat surfaces on opposite sides thereof which surfaces extend generally parallel to said axis about which said first arm of each pair swings;

a cavity on said second end of said second arm of each pair, said cavity opening through a face on said second arm facing the center of said circle in which said plurality of pairs are located, said opening having a width as measured parallel to the axis about which the particular second arm swings slightly greater than the distance between said two faces on said partial spherical ball and a length in the direction parallel to an axis extending through the first and second ends of second arm which length is at least equal to the diameter of the spherical surface of said cavity.

References Cited
UNITED STATES PATENTS

| | | | |
|---|---|---|---|
| 1,170,319 | 2/1916 | Papworth | 287—87 |
| 2,206,291 | 7/1940 | Nelson | 64—21 |
| 2,405,148 | 4/1946 | Keahey | 287—88 |
| 3,151,882 | 10/1964 | Foxwell et al. | 280—415 |

FRED C. MATTERN, JR., Primary Examiner

R. HEALD, Assistant Examiner

U.S. Cl. X.R.

287—88